UNITED STATES PATENT OFFICE.

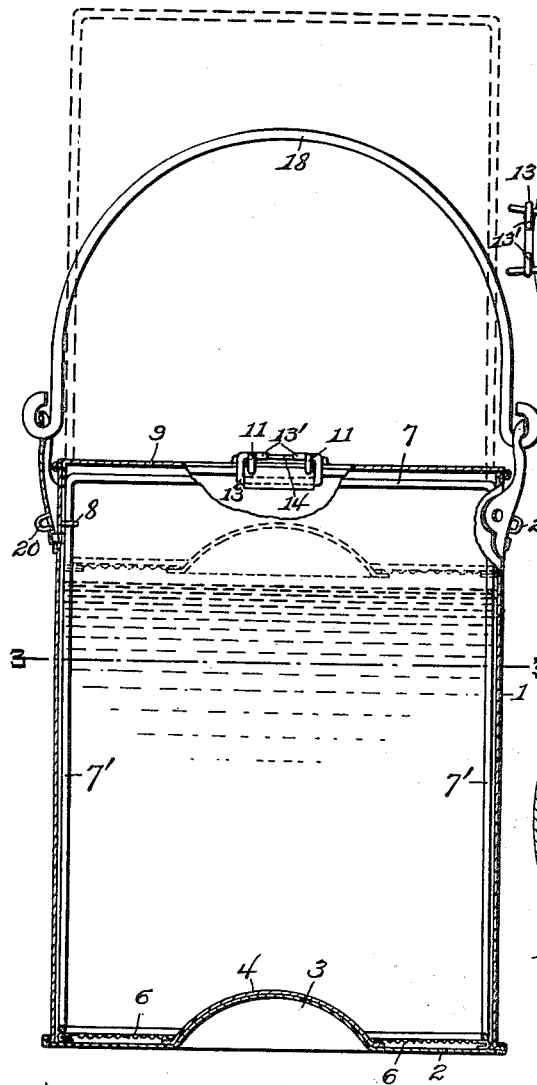
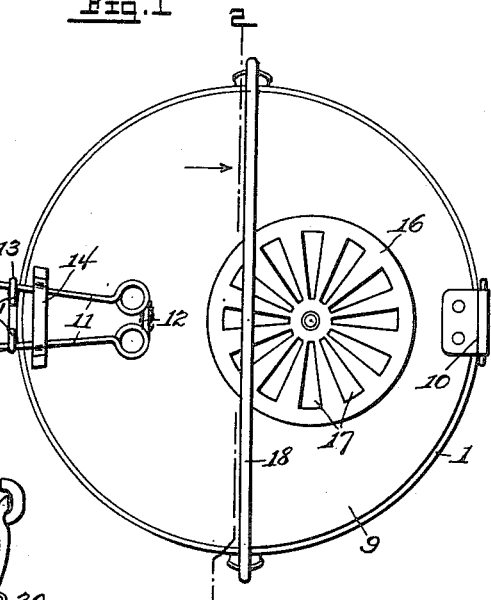
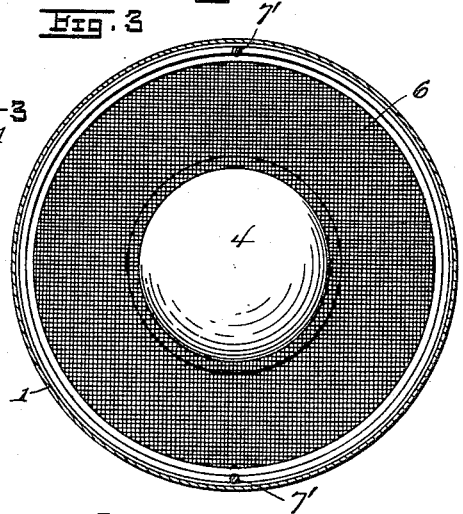

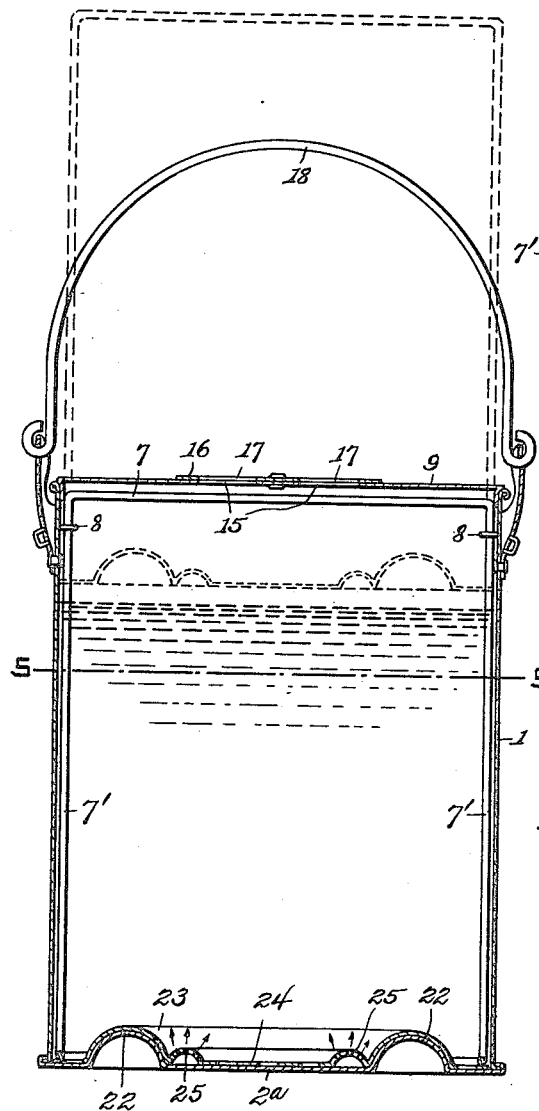
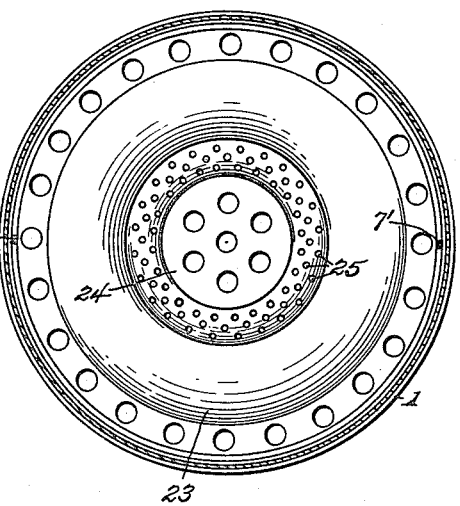
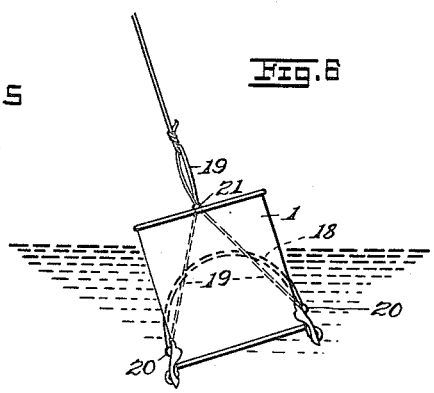

WALTER A. ROWE, OF KOKOMO, INDIANA.

BAIT-BUCKET.

1,127,522.   Specification of Letters Patent.   Patented Feb. 9, 1915.

Application filed June 16, 1914. Serial No. 845,420.

*To all whom it may concern:*

Be it known that I, WALTER A. ROWE, a citizen of the United States of America, and resident of Kokomo, county of Howard, and State of Indiana, have invented certain new and useful Improvements in Bait-Buckets, of which the following is a specification.

This invention relates broadly to bait buckets, and specifically to a vessel or container in which live bait may be preserved or maintained in good condition for an indefinite time.

The primary object of the invention is to provide a simple bucket or container in which live bait, as minnows and the like, may be carried and in which the same may be kept alive and in good condition for a comparatively long time.

A further object is to provide a container of the character mentioned which may be carried by hand in the manner of an ordinary bucket or pail and which is also adapted to float in water alongside a boat in such position that the water therein is constantly being renewed.

A still further object of the invention is to provide a bait bucket or container having means whereby the water therein may be refreshed or revivified from time to time by the introduction of air.

A further object within the contemplation of this invention is to provide a container of the character mentioned having means by which the removal of the bait as occasion requires is facilitated.

With these and other important objects in view, the invention resides in the features of construction, arrangement of elements and combinations of parts which will hereinafter be fully described, reference being had to the accompanying drawings, forming a part of this specification, in which—

Figure 1 is a top plan view of a bucket embodying my invention; Fig. 2 is a vertical section of the same on the line 2—2, Fig. 1; Fig. 3 is a horizontal section on the line 3—3, Fig. 2; Fig. 4 is a view similar to Fig. 2, illustrating a modification; Fig. 5 is a horizontal section on the line 5—5, Fig. 4; and Fig. 6 is a side elevation of the invention, drawn to a reduced scale, showing the same in floating position.

Referring to said drawings in which like designating characters distinguish like parts throughout the several views—1 indicates a bucket or similar container, preferably cylindrical in form and preferably formed of sheet metal. Fixed to said container at one end thereof is a bottom 2 which, in the preferred embodiment illustrated in Figs. 2 and 3, is upwardly dished, as by stamping, to form a central cone or inverted cup 3. Vertically movable within said container is a false bottom which, in said preferred embodiment, comprises a central sheet metal cone or cup 4 corresponding in size and form with the cone or cup 3, and a connected encircling flat foraminous portion 6, preferably composed of wire-netting, as shown in Figs. 2 and 3. Rigidly connected to the outer edge of said false bottom at diametrically opposite points are the lower ends of the upright members 7' of a lifting bail 7 by means of which said false bottom may be raised and lowered, said bail having a height somewhat less than the depth of the container and being guided in its movements by suitable guides, as rings or staples 8, which are fixed to the container adjacent to its top and loosely embrace said members 7'.

In practice the container is filled with water to a depth approximately three-fourths that of the container, and, with the false bottom lowered, the minnows or other bait are placed in the water. For the purpose of revivifying the water from time to time, the false bottom is elevated above the water and forced back to the bottom of the container, carrying therewith beneath the cup 4 a quantity of air which, as said cup closely approaches the cup 3, is thereby caused to be expelled and disseminated throughout the water, said air passing upward through the foraminous portion 6. With several successive strokes of the false bottom in the manner described sufficient fresh air is disseminated or diffused to freshen or revivify the water.

A cover 9 is hinged at one side on the container, as shown at 10, and a suitable clasp is provided at the opposite side for holding said cover closed. Said clasp comprises, preferably, a single length of resilient wire bent to form a pair of normally spread outwardly-extending fingers 11, the connecting cross-member 12 of which is rigidly connected, as by soldering, to the cover 9, as shown in Fig. 1. An open substantially rectangular ring 13 rigidly attached to the upper edge of the container has its inturned terminals 13' standing above the level of the cover. Said ring is adapted to receive the fingers 11 which are first pressed or drawn together by hand and introduced therein through the opening between the ends of its said terminals. A keeper 14 may be provided on the cover in overlying relation to said fingers for limiting the spread of said fingers when the said cover is raised.

Provided in the cover is a vent comprising a plurality of substantially triangular openings 15 arranged about a common center, and pivotally mounted over said vent is a rotatable disk 16 having openings 17 therein corresponding to said openings 15, said disk being adapted for rotation for carrying its openings into and out of registration with those of the cover.

A suitable bail 18 is provided on the container whereby the latter may be carried.

When it is desired to have the container trail in floating position in the stream alongside a boat, a trailing cord 19 is attached to hooks or eye-pieces 20 provided at opposite sides of the container near its top and is thence passed through an eye-piece 21 fixed to the side of the container near its bottom, as shown in Fig. 6. Said cord is adapted to have its free end suitably attached to the boat, and the container is thus held in an inverted position wherein it floats in the water of the stream, being buoyed up by the air between the water in the container and the closed bottom thereof. When floating the disk is rotated to open the vent in the cover, thus providing for the admission of a constantly renewed supply of fresh water. When the container is being carried by hand or by the cord 19 employed as a shoulder cord, the disk is preferably turned to a position closing the vent, thereby preventing the water from splashing from the container.

In the modification illustrated in Figs. 4 and 5, the bottom 2ª has a circular upwardly stamped ridge or bead 22, and the false bottom, composed wholly of sheet-metal, has a similar ridge or bead 23 formed therein adapted for fitting upon said bead 22, and also a flat central foraminous portion 24. As is obvious, the operation of this false bottom for introducing air into the water is the same as that of the form shown in Figs. 2 and 3. By the use of either form air is carried to the bottom whence it is expelled into the water, being directed upward through the small openings between the wire meshes or through the minute perforations 25 in the false bottom in spray-like streams.

When inverted in the water of a stream, the container is but partially filled so that the vessel floats with its bottom end up, and by reason of the manner in which it is attached to the boat by means of the cord 19, the overturning and consequent sinking of the container is effectually prevented.

When it is desired to remove bait from the container, the cover is raised and the false bottom is elevated by means of its bail, thus carrying the bait to the top of the water where it may be conveniently grasped.

While I have described the invention more or less in detail, it will be apparent that various slight changes in the construction and arrangement of parts within the skill of an ordinary mechanic may be resorted to without departing from the spirit or scope of the invention as defined in the appended claims. Hence I do not desire to be understood as limiting myself to the precise construction herein shown and described.

What is claimed is—

1. A bait bucket comprising a container having a bottom with an upwardly dished portion, a false bottom having an upwardly dished imperforate portion adapted for fitting over the dished portion of the first mentioned bottom and having a foraminous portion, means for elevating and lowering said false bottom, and a cover for said container.

2. A bait bucket comprising a container having a bottom with an upwardly dished portion, a false bottom having an upwardly dished imperforate portion adapted for fitting over the dished portion of the first mentioned bottom and having a foraminous portion, a bail connected to said false bottom and extending to a point adjacent to the top of said container, said false bottom being adapted to be raised and lowered by means of said bail, and a cover for said container.

3. A bait bucket comprising a container having a bottom with an upwardly dished portion, a false bottom having an upwardly dished imperforate portion adapted for fitting over the dished portion of the first mentioned bottom and having a foraminous portion, means for elevating and lowering said false bottom, a cover for said container, and a closable vent in said cover.

4. A bait bucket comprising a container having a bottom with an upwardly dished portion, a false bottom having an upwardly dished imperforate portion adapted for fitting over the dished portion of the first mentioned bottom and having a foraminous portion, means for elevating and lowering said false bottom, a cover hinged at one side upon said container, and a spring clasp for maintaining said cover closed.

5. A bait bucket comprising a container having a bottom with an upwardly dished portion, a false bottom having an upwardly dished imperforate portion adapted for fitting over the dished portion of the first mentioned bottom and having a foraminous portion, a bail connected to said false bottom and extending to a point adjacent to the top of said container, said false bottom being adapted to be raised and lowered by means of said bail, means for guiding said bail in raising and lowering, and a cover for said container.

6. A bait bucket comprising a container having a bottom with an upwardly dished portion, a false bottom having an upwardly dished imperforate portion adapted for fitting over the dished portion of the first mentioned bottom and having a foraminous portion, a bail connected to said false bottom and extending to a point adjacent to the top of said container, said false bottom being adapted to be raised and lowered by means of said bail, means for guiding said bail in raising and lowering, a cover for said container, and a closable vent in said cover.

7. A bait bucket comprising a container having a bottom with an upwardly dished portion, a false bottom having an upwardly dished imperforate portion adapted for fitting over the dished portion of the first mentioned bottom and having a foraminous portion, a bail connected to said false bottom and extending to a point adjacent to the top of said container, said false bottom being adapted to be raised and lowered by means of said bail, means for guiding said bail in raising and lowering, a cover for said container, a closable vent in said cover, and means for maintaining said container in inverted position when floating.

In testimony whereof, I affix my signature in presence of two subscribing witnesses.

WALTER A. ROWE.

Witnesses:
 S. C. MILLS,
 GEO. MIX.